United States Patent [19]

Camelli

[11] Patent Number: 5,649,461
[45] Date of Patent: Jul. 22, 1997

[54] BAR FEEDER FOR AUTOMATIC LATHES HAVING A VERTICAL SWINGING MAGAZINE

[75] Inventor: Marco Camelli, Faenza, Italy

[73] Assignee: I.E.M.C.A. Industria Elettromeccanica Complessi Automatici S.p.A., Faenza, Italy

[21] Appl. No.: 625,019

[22] Filed: Mar. 29, 1996

[30] Foreign Application Priority Data

Apr. 10, 1995 [IT] Italy ................... B095A0158

[51] Int. Cl.⁶ .................................................. B23B 13/10
[52] U.S. Cl. ............................................. 82/126; 414/15
[58] Field of Search .............. 82/125, 126; 414/14–17

[56] References Cited

U.S. PATENT DOCUMENTS 3,209,627  10/1965  Holmes ......................... 82/126
4,684,309   8/1987  Horn et al. .................... 414/224

FOREIGN PATENT DOCUMENTS 0587248  3/1994  European Pat. Off. .
1058904  6/1959  Germany ....................... 82/125
 659603  2/1987  Switzerland .
 676939  3/1991  Switzerland .

*Primary Examiner*—M. Rachuba
*Assistant Examiner*—Kenneth J. Hansen
*Attorney, Agent, or Firm*—Guido Modiano; Albert Josif

[57] ABSTRACT

The bar feeder comprises an oscillatable magazine in which bars are arranged so as to form a substantially vertical plane. A bar pusher is arranged at the top of the magazine; in one angular position of the magazine, the bar pusher pushes the upper bar into the mandrel of the lathe. Another pusher is arranged to the side of the bar pusher and, in the other angular position of the magazine, it pushes the bars towards the machining tools of the lathe. The magazine comprises two walls defined by a series of rods and uprights which can be spaced according to the diameter of the bars.

11 Claims, 5 Drawing Sheets

BAR FEEDER FOR AUTOMATIC LATHES HAVING A VERTICAL SWINGING MAGAZINE

BACKGROUND OF THE INVENTION

The present invention relates to a bar feeder for automatic lathes, particularly of the so-called short type.

Known bar feeders of the indicated type include a magazine for the bars composed of an inclined plane whereon the bars are arranged side by side. Appropriate release means release, each time, the lowermost bar inside a guide that is aligned with the tubular mandrel of the lathe. The advancement of the bar through the mandrel towards the machining tools is performed by means of a linear pusher.

These feeders have some drawbacks, mainly due to their excessive transverse bulk and to the complication of the operations required when the magazine must be adapted to contain bars having a different diameter.

SUMMARY OF THE INVENTION

A principal aim of the present invention is to provide a feeder that is structured so as to avoid the above mentioned shortcomings of known feeders.

Within the scope of this aim, an object of the present invention is to provide a feeder that allows quick and straightforward resupply of the bars inside the magazine.

With this aim and this object in view, there is provided a bar feeder for an automatic lathe provided with a tubular mandrel, through which the bars advance towards the machining tools, characterized in that it comprises: a bar magazine, which is oscillatably supported about a horizontal axis that is parallel to the axis of said mandrel and has two flat parallel frames which form a containment compartment for a plurality of bars to be fed into the lathe; a lifting unit, which is movable inside said compartment and acts as a support for said plurality of bars; means for setting the distance between said frames as a function of the diameter of said bars, so that said bars are parallel to the axis of the mandrel and are stacked so as to form a single substantially vertical plane; a device associated with said magazine for transferring the upper bar of said plane of bars into the mandrel of the lathe, and a pusher associated with said magazine for actuating the advancement strokes of said upper bar during machining operations after its transfer from the magazine into the mandrel; means being furthermore provided for causing said magazine to swing between a first position, in which said upper bar is aligned with the mandrel of the lathe in order to allow its transfer inside the mandrel by means of said device, and a second position, in which said pusher is aligned with said mandrel to allow the advancement of the bar inside the mandrel along strokes of preset length, said lifting unit being actuated when said magazine is in said second position.

BRIEF DESCRIPTION OF THE DRAWINGS

Further characteristics and advantages of the present invention will become apparent from the following detailed description of a preferred embodiment thereof, illustrated only by way of non-limitative example in the accompanying drawings, wherein.

DESCRIPTION OF THE PREFERRED EMBODIMENTS

Figure 1:
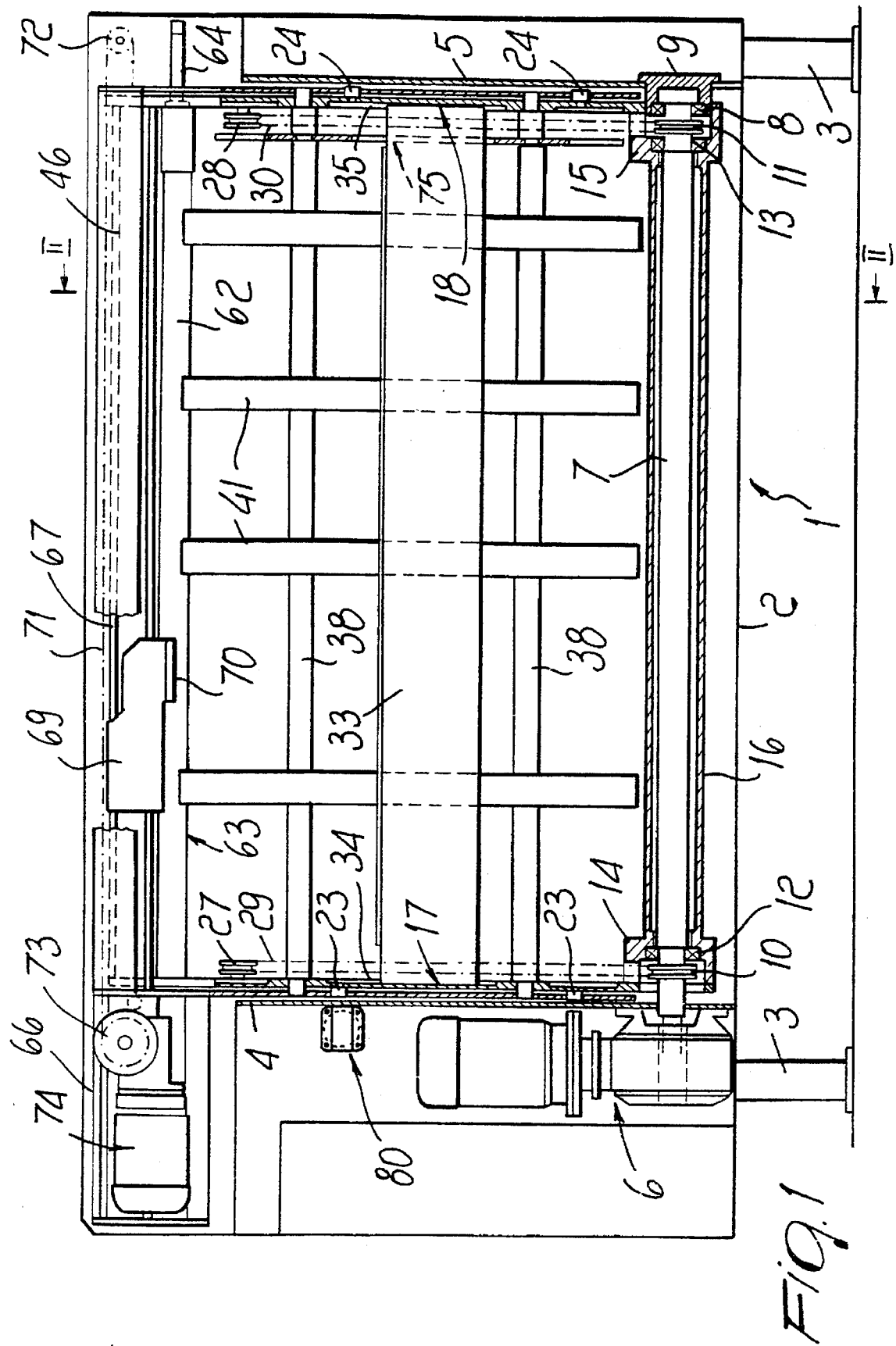
FIG. 1 is a lateral sectional elevation view of the feeder, taken along a longitudinal plane.

With reference to the above figures, the feeder is generally designated by the reference numeral 1 and comprises a framework 2 resting on the ground by means of feet 3.

The frame has two side walls 4 and 5 at its opposite ends. A gearmotor 6 is externally coupled to the side wall 4 by a flange and actuates a horizontal shaft 7, one end whereof is supported in said gearmotor and the opposite end whereof is supported, by means of a bearing 8, in a bush 9 fixed to the side wall 5. Two respective sprockets 10 and 11 are keyed on the opposite end portions of the shaft 7, proximate to the side walls 4 and 5; two bearings 12 and 13 are arranged on the shaft 7 proximate thereto. The bearings 12 and 13 support two respective cups 14 and 15 that are rigidly connected to each other by a tube 16 coaxial to the shaft 7.

Two vertical walls 17 and 18 that are perpendicular to the shaft 7 are fixed to the cups 14 and 15; said walls have, at their top, respective recesses 19 and 20 that are open upwardly. The walls 17 and 18 are spaced from the side walls 4 and 5 so as to form, together therewith, interspaces in which two respective plates 21 and 22, described in detail hereinafter, are accommodated.

Two pins 23 and 24 are fixed in each one of the walls 17 and 18 and cantilever out towards the side walls 4 and 5. The pins 23 and 24 are arranged on a plane A that is axially offset with respect to the axis of the shaft 7 and practically coincides with the centerline plane of the walls 17 and 18.

The pins 23 and 24 engage in slots 25 and 26 formed at the center of the plates 21 and 22 and aligned along the plane A. Therefore, the pins 23 and 24 act as guides for the sliding of the plates 21 and 22.

Two respective sprockets 27 and 28 are mounted at the top of the walls 17 and 18, below the recesses 19 and 20, so as to cantilever out; two respective chains 29 and 30 are entrained around said sprockets and are closed in a loop around the sprockets 10 and 11. One leg of the chains 29 and 30 lies on the plane A, whereas two respective jockey pulleys act on the other leg; the jockey pulleys related to the chain 30 are designated by the reference numerals 31 and 32 in FIG. 2.

The opposite ends of a horizontal beam 33 are fixed to the legs of the chains 29 and 30 that are co-planar to the plane A; said beam constitutes a bar lifting unit that can be raised and lowered by actuating the gearmotor 6. The ends of the lifting unit are slidingly engaged in guides 34 and 35 provided on the internal faces of the walls 17 and 18 and parallel to the plane A.

Respective pairs of slots 36 are formed in the plates 21 and 22, on the same side with respect to the slots 25 and 26. Similar slots 37 are formed on the opposite side with respect to the slots 25 and 26. The slots 36 and 37 are inclined at 45° and converge towards the top. The opposite ends of two parallel rods 38 are engaged in the slots 36; after passing through the plates 21 and 22, said rods engage respective slots 39 and 40 formed in the walls 17 and 18 to the side of the plane A and at right angles thereto.

The rods 38 are rigidly connected to each other by uprights 41. Likewise, the slots 37 of the plates 21 and 22 are crossed by two parallel rods 42 connected by uprights 43 and having opposite ends that engage, after passing through the slots 37, in slots 44 and 45 that are formed in the walls 17 and 18 at right angles to the plane A. The rods 38 and 42 and the corresponding uprights 41 and 43 form two respective frames that delimit a compartment for containing the bars C (see FIG. 2) of a magazine that is closed at the bottom by the lifting unit 33, which runs between said frames. The magazine oscillates about the shaft 7 by means of a jack 80, in which the stem 81 is rigidly coupled to a pivot 82 that is rigidly associated with the wall 17 and the cylinder 83 is articulated to the side wall 41.

The jack 80 lies outside the side wall 4 and the pivot 82, during the oscillating motions of the magazine, moves in an opening 84 of the side wall 4.

The plates 21 and 22 are connected at the top by a tubular profiled element 46 that passes through the recesses 19 and 20 of the walls 17 and 18 and are provided, in a downward region, with respective extensions 47 and 48 in which slots 49 and 50 are formed at right angles to the plane A. Pivots 51 and 52 engage in the slots 49 and 50 and protrude from respective cranks 53 and 54 that are pivoted on the inside faces of the walls 17 and 18 and are connected to each other by a rod 55. The pivots 51 and 52 pass through the walls 17 and 18 at openings 56 (FIG. 2) and 57 (FIG. 3) thereof, so that by actuating the cranks 53 and 54 the plates 21 and 22 move up or down.

The plates 21 and 22 are actuated by a strut 58 that is rotatable, at the top, in a support 59 fixed to the wall 17 and having a lower portion 60 that is threaded and screwed into a female thread 61 applied to the end of the crank 53 and rotatable about an axis that is parallel to the shaft 7. The top of the strut 58 protrudes from the support 59 and is shaped for the rotary coupling of an actuation handwheel which is not shown in the drawing.

The cylinder 62 of a hydraulic jack 63 is coupled to the top of the wall 18, to the side of the recess 20, at a flange; said jack is parallel to the shaft 7 and lateral with respect to the plane A. The stem 64 of the jack 63 extends beyond the plate 22 to the side of a recess 65 through which the bars C to be fed into the lathe are driven.

The end of the cylinder 62 lying opposite to the stem 64 is fixed to a bracket 66 that protrudes from the lateral upper edges of the wall 17. In this manner, the cylinder 62, by interconnecting the walls 17 and 18, acts as a stiffening element.

Two parallel and superimposed rods 67 and 68 lie above the cylinder 62 and are fixed to the walls 17 and 18. The rods 67 and 68 constitute a guide for a supporting slider 69 for a bar pusher 70. The slider 69 is coupled to a chain 71 that is closed in a loop on a sprocket 72 and a pinion 73, so that the leg of the chain to which the slider 69 is rigidly coupled is parallel to the guiding rods 67 and 68.

The pinion 73 is keyed on the output shaft of a gearmotor 74 that is fixed in the bracket 66 and causes a back-and-forth motion of the bar pusher 70.

While feeding the bars into the lathe, the bar pusher advances in the direction B (FIG. 3) and pushes the upper bar C1 between those resting on the lifting unit 33 in the mandrel of the lathe.

To prevent the underlying bar C2 from also being moved by friction in the same direction B, there is provided an axial stop element, against which the underlying bar C2 abuts; said stop element is capable of automatically moving vertically as a function of the diameter of the bars so as to allow only to remove the upper bar and retain the underlying bars.

Said stop element is constituted by a flat strip 75 provided with two slots 76 that are parallel to the plane A and with two slots 77 that are parallel but oblique with respect to the plane A.

The flat strip 75 is arranged on the inner side of the chain 30, which therefore remains between said strip and the wall 18.

Respective pins 78 engage in the slots 76, protrude from the wall 18, and ensure the sliding of the strip 75 parallel to the plane A. The slots 77 are instead crossed by the rods 38 and have an opposite inclination with respect to the slots 37 of the plate 22. Accordingly, when the rods 38 move away with respect to the plane A to allow the magazine to widen and receive large-diameter bars, the flat strip 75 moves downwards, allowing its upper region 79 to lie below the upper bar C1 at the level of the directly underlying bar C2, so as to stop it if it is entrained when the upper bar is pushed into the mandrel by the bar pusher 70. If the bar is thinner, so that the magazine must be made narrower, the rods 38, by moving closer to the plane A, cause a corresponding lifting of the strip 75 so that the bar lying directly below the upper bar is always retained.

The operation of the described feeder is as follows.

First of all, the magazine is preset according to the diameter of the bars C to be fed. For this purpose, the shaft 58 is actuated, by means of the appropriate handwheel, so that the cranks 53 and 54, by means of the pivots 51 and 52, act on the plates 21 and 22, lifting or lowering them.

The lifting of the plates 21 and 22 by virtue of the engagement of the rods 38 and 42 in the slots 36 and 37 causes the widening of the frames 38, 41 and 42, 43 of the magazine, whereas the strip 75 moves downward correspondingly. Vice versa, when the plates move downwards, the frames of the magazine move closer together and the strip 75 rises.

After presetting the magazine, the bars C are inserted therein. The bars are then lowered from above between the uprights 41 and 43 and are rested on the lifting unit 33.

It should be noted that during this step for the insertion of the bars, the magazine is inclined in a position in which the jack 63 is aligned with the mandrel of the lathe and causes the advancement of the bar being machined towards the tools. This position is shown in dashed lines in FIG. 2.

After inserting the desired number of bars into the magazine, the gearmotor 6 is actuated, raising the lifting unit 33 until the upper bar abuts against the lower face of the profile 46.

Figure 2:
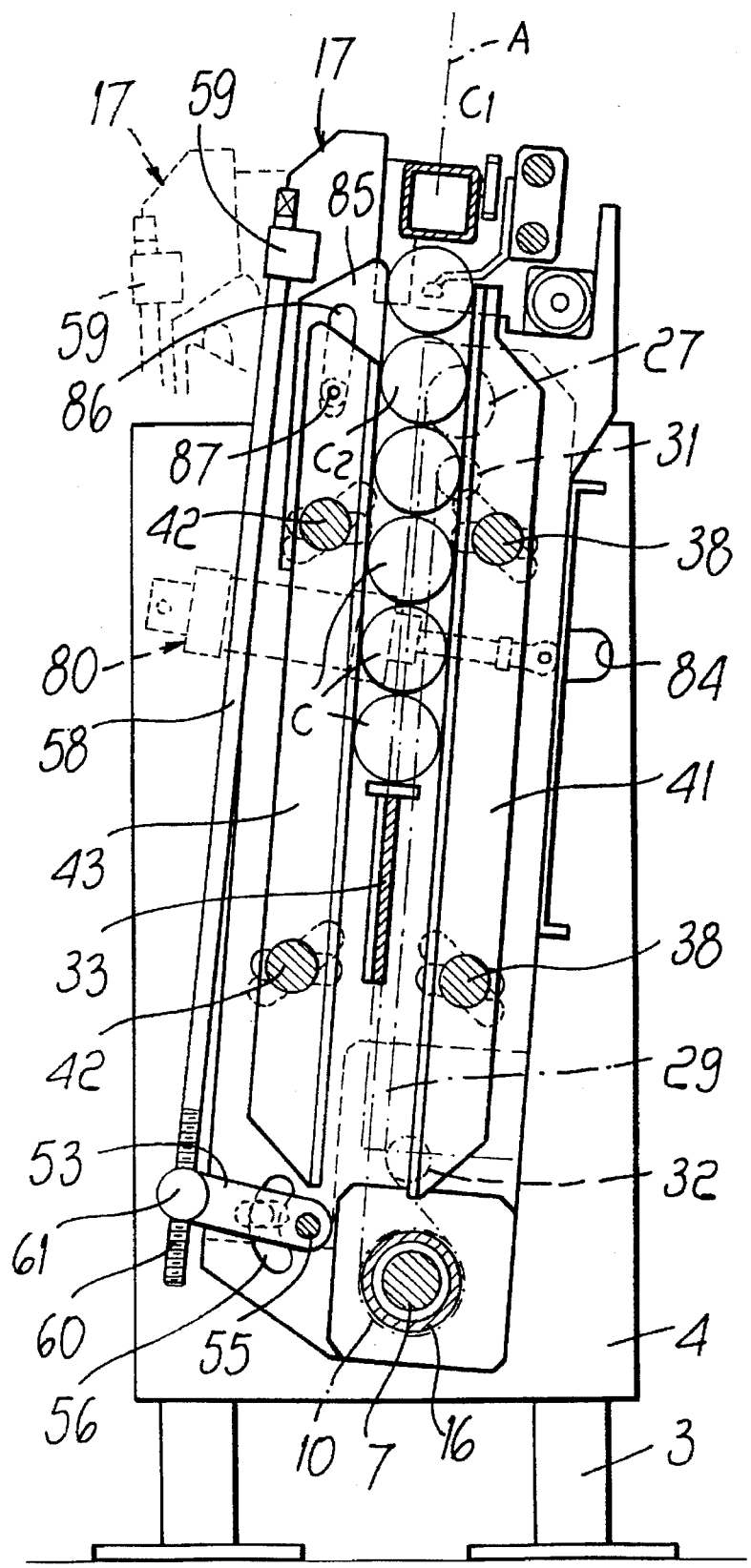
FIG. 2 is a transverse sectional view, taken along the plane II—II of FIG. 1.
Figure 3:
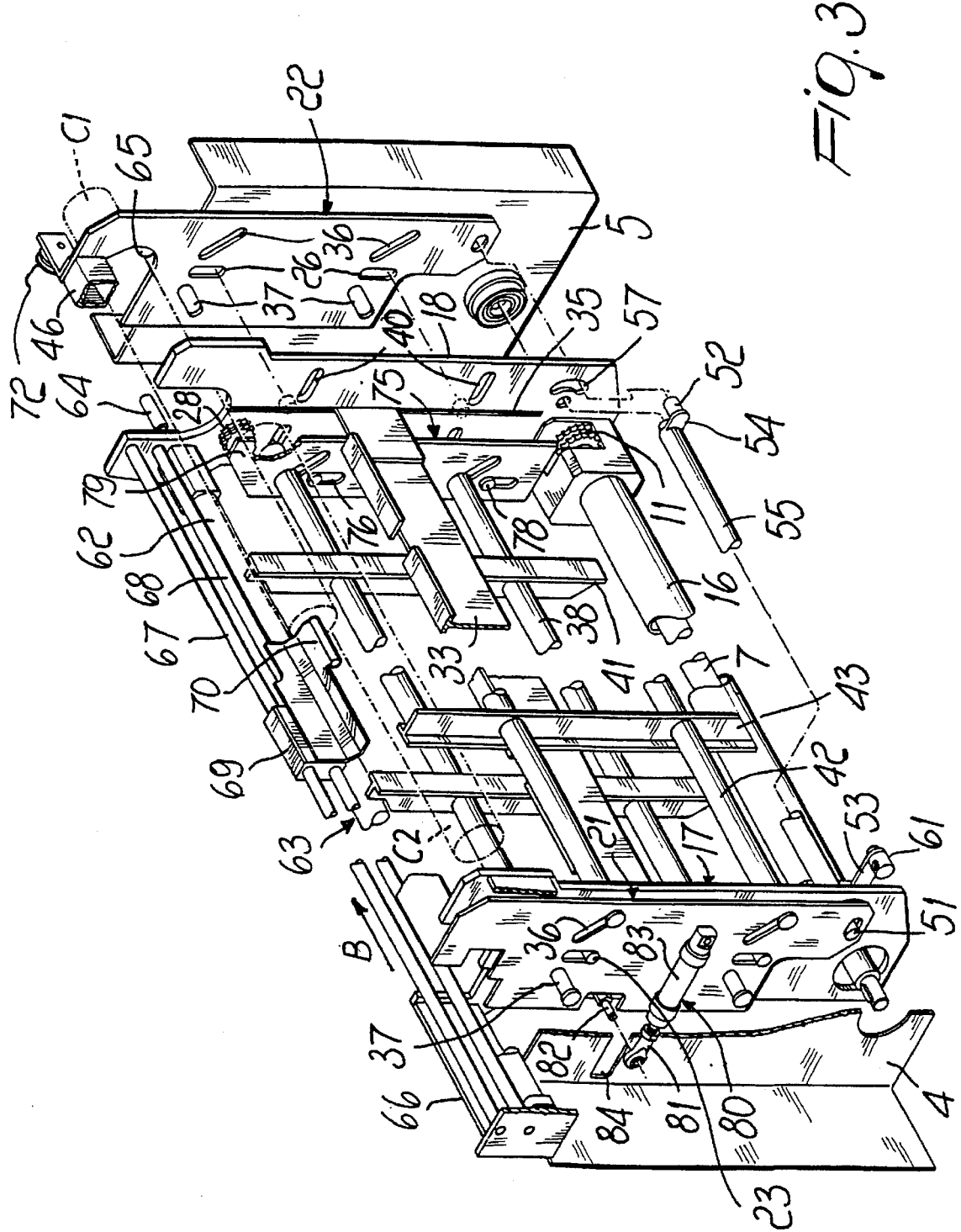
FIG. 3 is a perspective view of the feeder with some components shown in exploded view.
Figure 4:
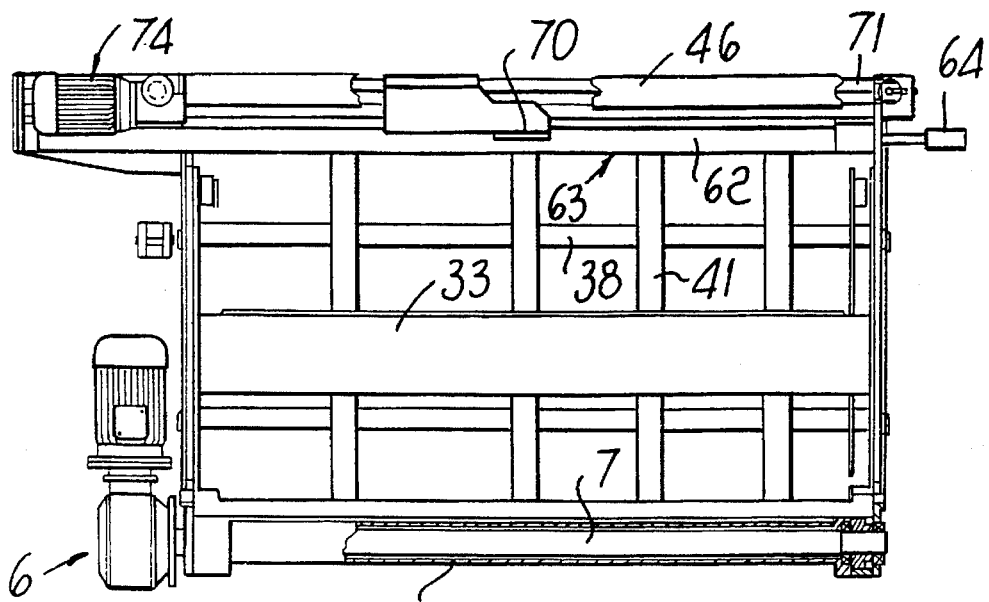
FIG. 4 is a view, similar to FIG. 1, with some parts.
Figure 4A:
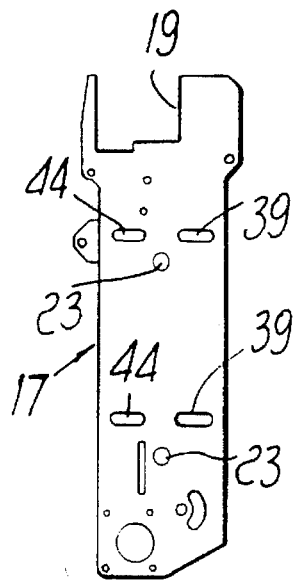
FIG. 4a is a front elevational view of a vertical wall of the bar feeder of FIG. 4, showing the arrangement of slots and pins associated therewith.
Figure 4B:
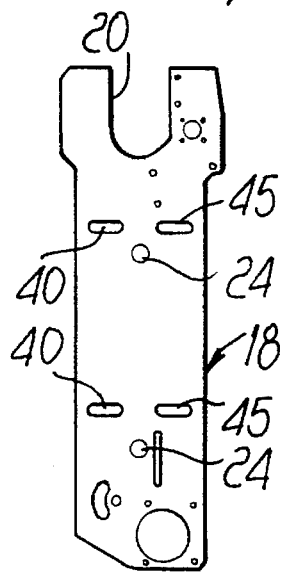
FIG. 4b is a front elevational view of another vertical wall of the bar feeder of FIG. 4.
Figure 4C:
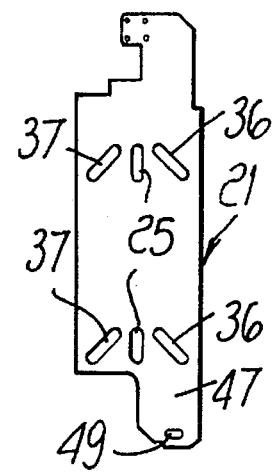
FIG. 4c is a front elevational view of a plate of the bar feeder of FIG. 4, showing the arrangement of slots formed therein.
Figure 4D:
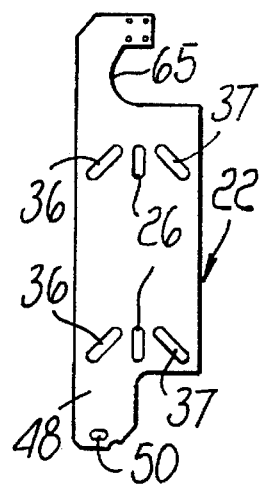
FIG. 4d is a front elevational view of another plate of the bar feeder of FIG. 4.
Figure 4E:
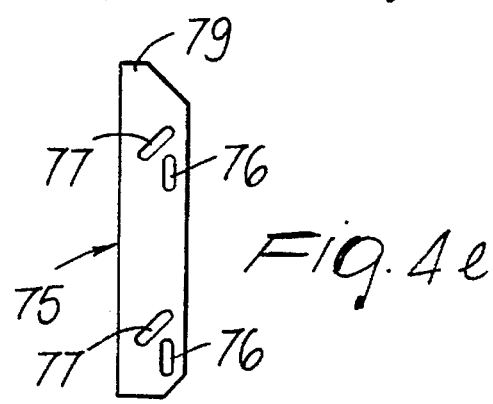
FIG. 4e is a front elevational view of a flat strip of the bar feeder of FIG. 4, showing the arrangement of slots formed therein.
Figure 5:
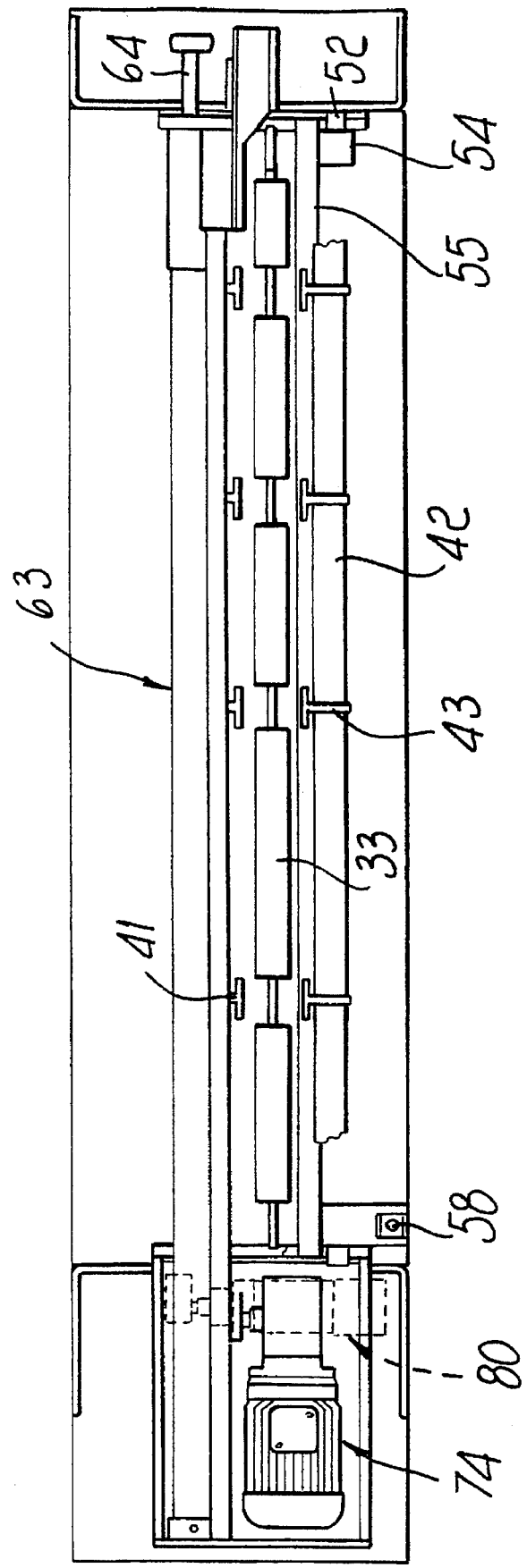
FIG. 5 is a plan view of the feeder.

When the bar being machined is used up and the stem 64 of the jack 63 has been retracted out of the mandrel of the lathe, the jack 80 is actuated, causing the magazine to swing into the position in which the upper bar, in contact with the profile 46, is aligned with the mandrel (position shown in solid lines in FIG. 2). It should be noted that when the magazine swings, a small angular shift occurs between the tube 16 and the shaft 7, which leads to a small sliding of the chains 29 and 30 with respect to the structure of the magazine and, ultimately, to a descent of the lifting unit 33 that is sufficient to free the upper bar C1 from the clamping action between the directly underlying bar C2 and the profile 46.

Once alignment with the mandrel has been established, the gearmotor 74 is activated; by means of the bar pusher 70, it pushes the bar into the mandrel until the rear end of said bar has moved beyond the plate 22.

Once this position (which corresponds to the one shown in FIG. 2) has been reached, while the bar pusher 70 is returned to the starting point proximate to the wall 17, the jack 80 is activated, causing the magazine to swing into the position in which the other jack 63 is aligned with the mandrel, so as to allow the advancement of the stem in the mandrel and therefore of the bar towards the machining tools.

While the machining operations continue, the underlying bar C2 is raised against the profile 46 by the lifting unit 33 and the operating steps follow one another in the above described sequence.

A substantial prerogative of the present invention is the fact that the bars to be machined are stored along a substantially vertical plane, thereby maintaining very small transverse dimensions of the feeder.

The described magazine is susceptible to numerous modifications and variations, all of which are within the scope of the inventive concept. Thus, for example, sectors 85 are provided at the ends of the uprights 43, i.e., on the side where the bars are inserted in the magazine; said sectors are provided with slots 86 that are elongated towards the uprights and in which guiding pivots 87, mounted in a cantilevered manner on the uprights, engage. The sectors 85 are kept in the raised position by springs (not shown in the drawing) so as to close the opening for access of the bars in the magazine and so as to extend the bar containment compartment upwards until it reaches below the profile 46.

In a different embodiment of the invention, instead of the chains 29 and 30 it is possible to use flexible elements of another kind, such as toothed belts, cables, and the like.

A particularly advantageous solution replaces the chains with a system of threaded rods that are rotatably supported in the walls 17 and 18 and are engaged in female threads of the lifting unit. The threaded rods, by means of gears (for example of the bevel gear pair type), are driven by the driving shaft 7.

Likewise, the bar pusher 70 can also be actuated by an actuator of another kind, for example of the screw-and-nut type.

What is claimed is:

1. Bar feeder for an automatic lathe provided with a tubular mandrel, through which the bars advance towards the machining tools, comprising: a magazine for the bars, which is oscillatably supported about a horizontal axis that is parallel to the axis of said mandrel and has two flat parallel frames which form a containment compartment for a plurality of bars to be fed into the lathe; a lifting unit, which is movable inside said compartment and acts as a support for said plurality of bars; means for setting the distance between said frames as a function of the diameter of said bars, so that said bars are parallel to the axis of the mandrel and are stacked so as to form a single substantially vertical plane; a device associated with said magazine for transferring the upper bar of said plurality of bars into the mandrel of the lathe, and a pusher associated with said magazine for advancing said upper bar during machining operations after its transfer from the magazine into the mandrel; means being furthermore provided for causing said magazine to swing between a first position, in which said upper bar is aligned with the mandrel of the lathe in order to allow its transfer inside the mandrel by means of said device, and a second position, in which said pusher is aligned with said mandrel to allow for advancement of the bar inside the mandrel along strokes of preset length, said lifting unit being actuated when said magazine is in said second position.

2. Feeder according to claim 1, wherein said magazine comprises a tubular element that is rotatably supported about a horizontal axis in a frame, two walls that are fixed to the opposite ends of said tubular element and lie at right angles to said axis, two pins that protrude in opposite directions from said walls and are arranged on a plane that is axially offset with respect to said axis; and wherein in each one of said walls and on opposite sides with respect to said axially offset plane there are provided two pairs of slots that are perpendicular to said axially offset plane and two plates that are adjacent to said walls, each plate being provided with slots, which lie on said plane and are engaged by said pins, and with oblique slots that converge towards said plane and are adapted to overlap the slots of said walls, said plates being connected at the top by a profile that lies on said plane and being operatively coupled to means adapted to move them with respect to said walls; each one of said frames further comprising horizontal rods that are connected by uprights and have opposite ends engaging in the oblique slots of said plates through the slots of said walls so that the movement of said plates with respect to said walls causes the spacing or mutual approach of said frames with respect to said axially offset plane.

3. Feeder according to claim 2, wherein said lifting unit comprises a horizontal beam arranged between said frames and having opposite ends that are guided in guides of said walls and are coupled to a linear actuator.

4. Feeder according to claim 3, wherein said linear actuator comprises two flexible elements having two arms that are arranged on said axially offset plane and are actuated by a gearmotor.

5. Feeder according to claim 4, wherein the opposite ends of said beam are fixed to the legs of respective chains that constitute said flexible elements and are arranged on said axially offset plane, each one of said chains being closed in a loop on a sprocket that is rotatably mounted at the top of a respective wall and on a pinion that is keyed on a shaft that is rotatably supported inside said tubular element and is actuated by a gearmotor, said chains being guided through openings of said tubular element.

6. Feeder according to claim 3, wherein said linear actuator comprises two threaded rods that are rotatably supported in the walls of said framework and are engaged in female threads rigidly coupled to said lifting unit, said rods being actuated by a gearmotor by means of gears.

7. Feeder according to claim 2, wherein the means for moving said plates comprise at least one crank that is pivoted about an axis that is parallel to the oscillation axis of said magazine and has a pivot engaging a slot of a respective plate and a female thread in which a strut actuated by a handwheel is screwed, the actuation of said handwheel being adapted to swing the crank so as to cause the movement of said plates and of the frames.

8. Feeder according to claim 2, wherein it comprises a flat strip that is guided in the wall of the side where the bar exits from the magazine and can slide parallel to said axially offset plane, slots being formed in said strip, one of said frames having horizontal rods guided through said slots, said slots being orientated so that, during the spacing and mutual approach of the frames, the top of the strip constitutes a retainer for the bar lying directly below the upper bar contained in the magazine.

9. Feeder according to one of claim 1, wherein said device for transferring the upper bar comprises a bar pusher that is rigidly coupled to a slider slideable on guides that are parallel to said axis and are fixed between said walls, said slider being actuated by a linear actuator.

10. Feeder according to claim 9, wherein said linear actuator comprises a chain that is actuated by a gearmotor mounted on one of said walls, said slider being fixed to said chain.

11. Feeder according to claim 1, wherein said pusher is actuated by a linear actuator fixed between said walls to the side of said bar transfer device.

* * * * *